(12) United States Patent
Gholmieh et al.

(10) Patent No.: US 8,094,554 B2
(45) Date of Patent: Jan. 10, 2012

(54) COMPRESSED MODE OPERATION AND POWER CONTROL WITH DISCONTINUOUS TRANSMISSION AND/OR RECEPTION

(75) Inventors: Aziz Gholmieh, San Diego, CA (US);
Etienne F. Chaponniere, Rome (IT);
Francesco Grilli, La Jolla, CA (US);
Juan Montojo, San Diego, CA (US);
Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 961 days.

(21) Appl. No.: 11/923,983

(22) Filed: Oct. 25, 2007

(65) Prior Publication Data

US 2008/0102880 A1 May 1, 2008

Related U.S. Application Data

(60) Provisional application No. 60/863,128, filed on Oct. 26, 2006.

(51) Int. Cl.
*H04J 3/14* (2006.01)
(52) U.S. Cl. ......... 370/230; 370/322; 370/328; 370/330
(58) Field of Classification Search .............. 370/229, 370/230, 235, 310, 322, 328, 329, 330
See application file for complete search history.

(56) References Cited

U.S. PATENT DOCUMENTS

| | | | |
|---|---|---|---|
| 5,701,302 A | 12/1997 | Geiger | |
| 6,785,250 B2 * | 8/2004 | Vayanos et al. | 370/335 |
| 7,372,842 B2 | 5/2008 | Kim et al. | |
| 7,406,056 B2 * | 7/2008 | Warich et al. | 370/318 |
| 7,941,626 B2 * | 5/2011 | Marinier et al. | 711/167 |
| 2002/0064140 A1 | 5/2002 | Numminen | |
| 2002/0176513 A1 * | 11/2002 | Gouessant et al. | 375/297 |
| 2006/0002323 A1 * | 1/2006 | Hildebrand et al. | 370/321 |
| 2006/0034245 A1 * | 2/2006 | Nguyen | 370/345 |

(Continued)

FOREIGN PATENT DOCUMENTS

CN 1427636 A 7/2003

(Continued)

OTHER PUBLICATIONS

Nokia, 3GPP TSG-RAN WG1 Meeting #46bis R1-062892, Seoul, South Korea, Oct. 9-13, 2006.

(Continued)

*Primary Examiner* — Kwang B Yao
*Assistant Examiner* — Nguyen Ngo
(74) *Attorney, Agent, or Firm* — Charles Chesney

(57) ABSTRACT

Techniques to support operation in a compressed mode and/or a continuous packet connectivity (CPC) mode are described. In an aspect, a user equipment (UE) may obtain an assignment of enabled subframes for the CPC mode and an assignment of transmission gaps for the compressed mode. The transmission gaps may be aligned with idle times between the enabled subframes. The UE may exchange data during enabled subframes not overlapping the transmission gaps and may skip data exchanges during enabled subframes overlapping the transmission gaps. The UE may make cell measurements during the transmission gaps. In another aspect, the UE may obtain enabled subframes and skipped subframes, exchange data during enabled subframes not corresponding to the skipped subframes, and skip data exchanges during the skipped subframes. In yet another aspect, the UE may receive orders on a shared control channel to quickly enable and disable the compressed mode.

40 Claims, 10 Drawing Sheets

U.S. PATENT DOCUMENTS

| | | | |
|---|---|---|---|
| 2006/0072612 | A1 | 4/2006 | Lietz |
| 2007/0037601 | A1* | 2/2007 | Mittal et al. ............... 455/525 |
| 2007/0133479 | A1* | 6/2007 | Montojo et al. ............ 370/335 |
| 2007/0207824 | A1* | 9/2007 | Bhattacharjee et al. ...... 455/513 |
| 2008/0069280 | A1* | 3/2008 | Wang et al. .................. 375/363 |
| 2008/0101280 | A1* | 5/2008 | Gholmieh et al. ........... 370/328 |
| 2008/0309490 | A1* | 12/2008 | Honkanen et al. ......... 340/572.1 |
| 2009/0203381 | A1* | 8/2009 | Ueda ............................ 455/439 |

FOREIGN PATENT DOCUMENTS

| | | |
|---|---|---|
| EP | 1670272 | 6/2006 |
| JP | 2005034555 A | 2/2005 |
| JP | 2005229628 A | 8/2005 |
| JP | 2007510341 A | 4/2007 |
| TW | 580805 | 3/2004 |
| WO | 02058280 | 7/2002 |
| WO | WO2005046073 A1 | 5/2005 |

OTHER PUBLICATIONS

"Interaction of compressed mode with HSDPA" 3rd Generation Partnership Project (3GPP); Technical Specification Group (TSG) Radio Access Network (RAN); Working Group 1 (WG1), XX, XX, Feb. 22, 2002, pp. 1-3, XP002224780 the whole document.

INFINEON: "Alignment of CPC UL DRX TTI due to Compressed Mode" 3GPP TSG-RAN WG2 Meeting #58, May 7, 2007-May 11, 2007 pp. 1-3, XP002466339 Kobe, Japan. The whole document.

3GPP Group Radio Access Networks: "Physical layer procedures, (FDD), 3G TS 25.214 version 3.0.0" 3rd Generation Partnership Project (3GPP), Technical Specification, Oct. 1, 1999, pp. 1-39, XP002473924.

International Search Report—PCT/US07/082746, International Search Authority—European Patent Office— Apr. 9, 2008.

3GPP TR 25.903 v7.0.0, "3rd Generation Partnership Project; Technical Specification Group Radio Access Network; Continuous Connectivity for Packet Data Users," Release 7, Mar. 2007.

3GPP TS 25.211 v7.3.0 (Sep. 2007), 3rd Generation Partnership Project; Technical Specification Group Radio Access Network: Physical channels and mapping of transport channels onto physical channels (FDD) (Release 7).

Written Opinion—PCT/US07/082746, International Searching Authority—European Patent Office, Apr. 9, 2008.

Dorot V.L. and Novikov F.A., Explanatory Dictionary for Computer Lexis, BHV-Petersburg, 2001, p. 339.

"Taiwan Search Report—TW096140475—TIPO- Jun. 15, 2011".

* cited by examiner

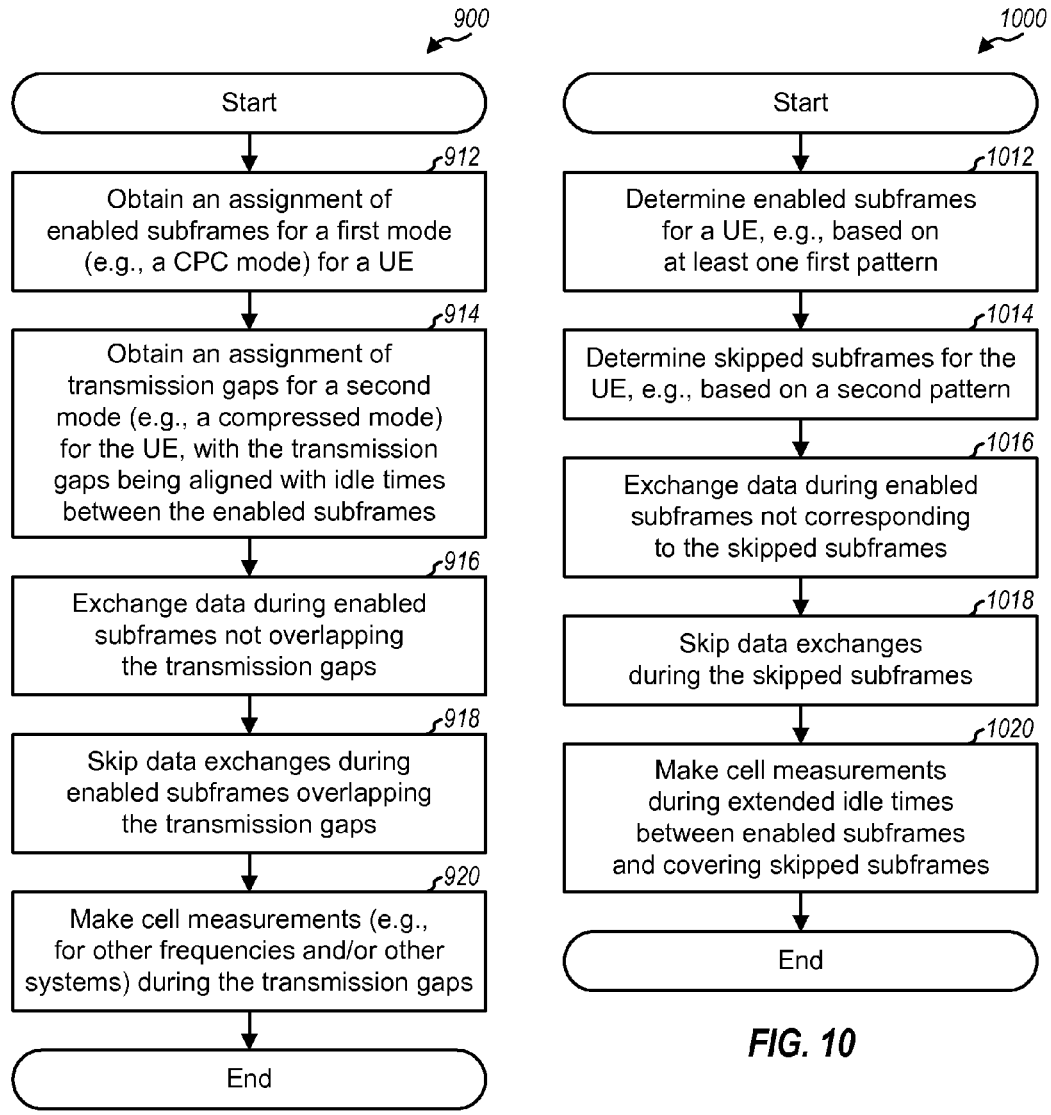

COMPRESSED MODE OPERATION AND POWER CONTROL WITH DISCONTINUOUS TRANSMISSION AND/OR RECEPTION

CLAIM OF PRIORITY UNDER 35 U.S.C. §119

The present Application for Patent claims priority to Provisional U.S. Application Ser. No. 60/863,128, entitled "COMPRESSED MODE OPERATION AND REVERSE LINK POWER CONTROL ADJUSTMENT WITH DISCONTINUOUS TRANSMISSION AND/OR RECEPTION," filed Oct. 26, 2006, assigned to the assignee hereof, and expressly incorporated herein by reference.

BACKGROUND

I. Field

The present disclosure relates generally to communication, and more specifically to techniques for operating a user equipment (UE) in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A UE (e.g., a cellular phone) may be capable of operating on different frequencies and/or in different wireless systems. The UE may communicate with a serving cell on a particular frequency in one system but may periodically make measurements for cells on other frequencies and/or in other systems. The cell measurements may allow the UE to ascertain whether any cell on another frequency and/or in another system is better than the serving cell. This may be the case, for example, if the UE is mobile and moves to a different coverage area. If a better cell on another frequency and/or in another system is found, as indicated by the cell measurements, then the UE may attempt to switch to the better cell and receive service from this cell.

To make cell measurements for other frequencies and/or other systems, the UE may need to tune its receiver away from the frequency used by the serving cell. The system may provide gaps in transmission in order to allow the UE to tune away its receiver and make measurements for other frequencies and/or other systems. The operation of the UE may be complicated by these gaps in transmission.

SUMMARY

Techniques to support operation of a UE in a compressed mode with transmission gaps and/or a continuous packet connectivity (CPC) mode with discontinuous transmission (DTX) and/or discontinuous reception (DRX) are described herein. In an aspect, the UE may obtain an assignment of enabled subframes for the CPC mode and an assignment of transmission gaps for the compressed mode. The transmission gaps may be aligned with the idle times between the enabled subframes. For example, each transmission gap may start in an idle time between consecutive enabled subframes. The enabled subframes may be defined by at least one first pattern, the transmission gaps may be defined by at least one second pattern, and each second pattern may be multiple times the duration of each first pattern. The UE may exchange data during the enabled subframes that do not overlap the transmission gaps and may skip data exchanges during the enabled subframes that overlap the transmission gaps. The UE may make cell measurements (e.g., for other frequencies and/or other systems) during the transmission gaps.

In another aspect, the UE may determine enabled subframes and skipped subframes, e.g., for the CPC mode. The skipped subframes may be a subset of the enabled subframes. The UE may exchange data during the enabled subframes not corresponding to the skipped subframes and may skip data exchanges during the skipped subframes. The UE may make cell measurements during the extended idle times between enabled subframes and covering the skipped subframes. The UE may not need to operate in the compressed mode because of the extended idle times.

In yet another aspect, the UE may obtain a configuration for the compressed mode and may receive orders on a shared control channel to enable and disable the compressed mode. The configuration for the compressed mode may be sent via upper layer signaling, and the orders may be sent as lower layer signaling. The UE may operate based on the configuration for the compressed mode when enabled by an order received via the shared control channel. The orders may be used to quickly disable the compressed mode prior to a data burst for the UE and to quickly re-enable the compressed mode after the data burst.

In yet another aspect, the UE may determine transmit power used for a first transmission sent in a first time interval and may determine transmit power to use for a second transmission in a second time interval based on the transmit power used for the first transmission and a power adjustment. The second time interval may be separated from the first time interval by an idle period, which may correspond to a transmission gap in the compressed mode or an idle time between enabled subframes in the CPC mode. The power adjustment may be determined based on open loop estimates obtained for the first and second transmissions. The power adjustment may also be a predetermined positive value, an increasing value during an initial part of the second transmission, etc.

Various aspects and features of the disclosure are described in further detail below.

BRIEF DESCRIPTION OF THE DRAWINGS

FIG. 9 shows a process for UE operation with transmission gaps aligned with idle times.

FIG. 10 shows a process for UE operation by skipping some enabled subframes.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of UMTS. 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMTS, and 3GPP terminology is used in much of the description below.

Figure 1:
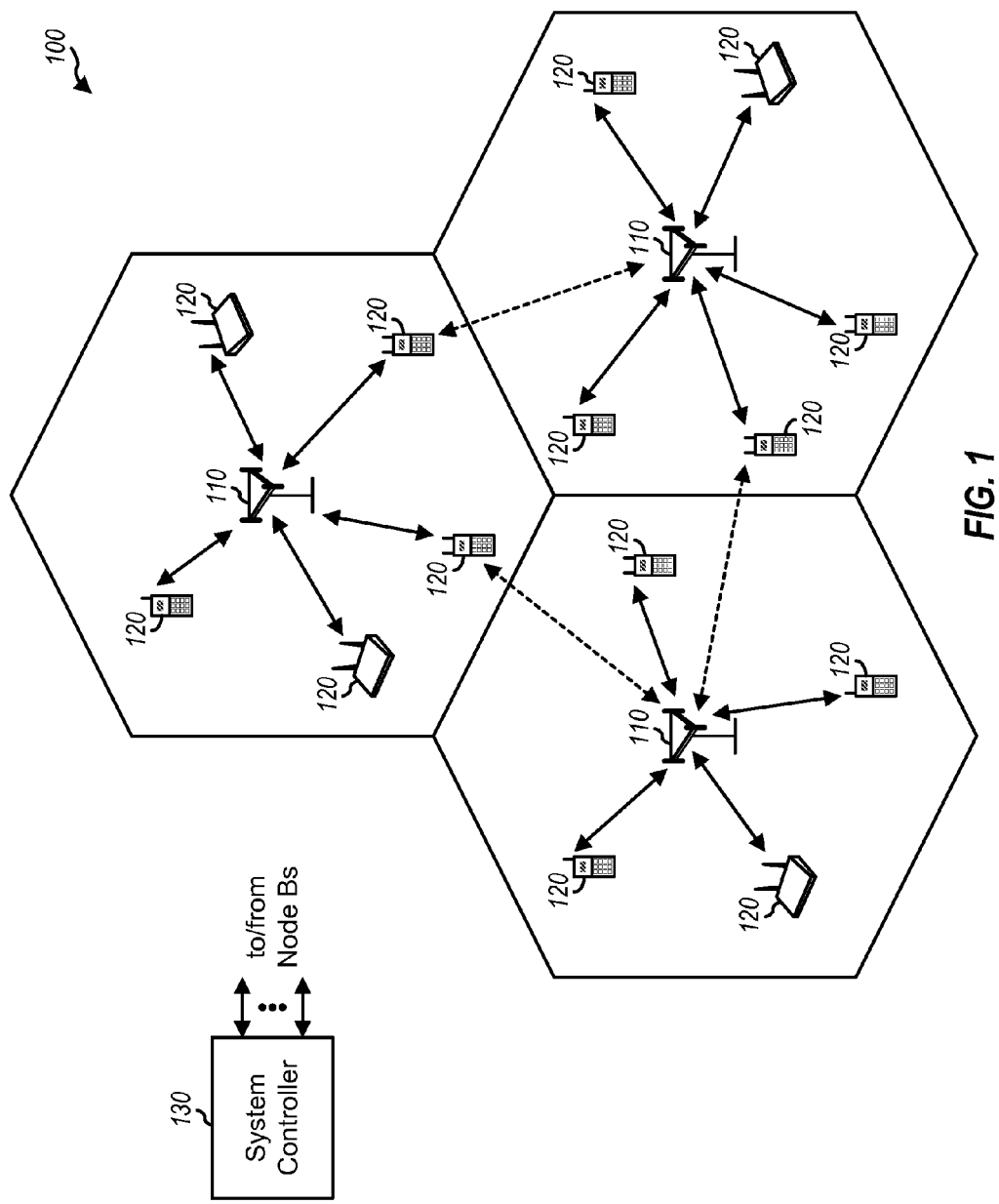
FIG. 1 shows a wireless communication system.

FIG. 1 shows a wireless communication system 100 with multiple Node Bs 110 and UEs 120. A Node B may be a fixed station that communicates with the UEs and may also be referred to as an evolved Node B (eNB), a base station, an access point, etc. Each Node B 110 provides communication coverage for a particular geographic area and supports communication for the UEs located within the coverage area. The overall coverage area of each Node B 110 may be partitioned into multiple (e.g., three) smaller areas. In 3GPP, the term "cell" can refer to the smallest coverage area of a Node B and/or a Node B subsystem serving this coverage area. In other systems, the term "sector" can refer to the smallest coverage area and/or the subsystem serving this coverage area. For clarity, 3GPP concept of cell is used in the description below. A system controller 130 may couple to Node Bs 110 and provide coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs.

Figure 2:
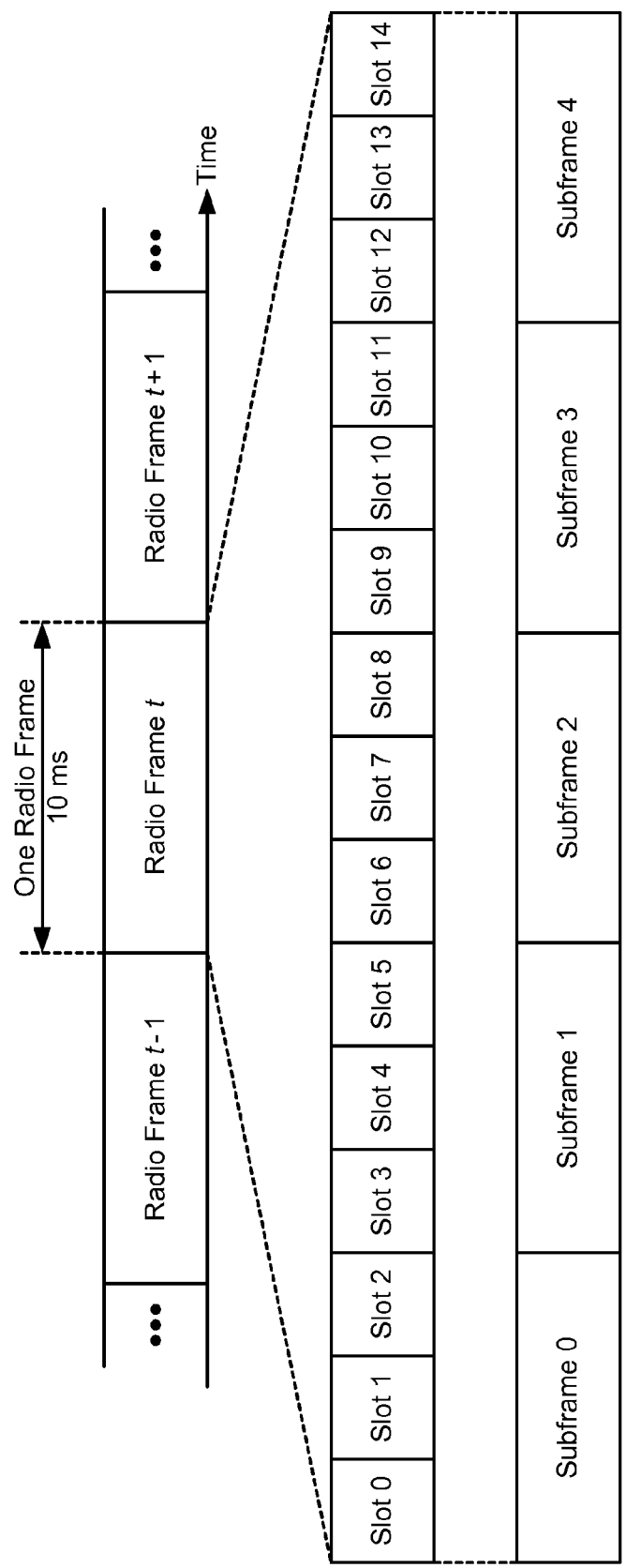
FIG. 2 shows a frame format in Universal Mobile Telecommunication System (UMTS).

FIG. 2 shows a frame format in UMTS. The timeline for transmission is divided into radio frames. Each radio frame has a duration of 10 milliseconds (ms) and is identified by a 12-bit system frame number (SFN) that is sent on a control channel. Each radio frame may also be identified by an 8-bit connection frame number (CFN) that is maintained by both a UE and a Node B for a call. Each radio frame is partitioned into 15 slots, which are labeled as slot 0 through slot 14. Each slot has a duration of $T_{slot}=0.667$ ms and includes 2560 chips at 3.84 Mcps. Each radio frame is also partitioned into five subframes 0 through 4. Each subframe has a duration of 2 ms and includes 3 slots.

UMTS supports a compressed mode on the downlink to provide gaps in transmission to allow a UE to make measurements for neighbor cells. In the compressed mode, a serving cell may transmit data to the UE during only a portion of a radio frame, which then creates a transmission gap in the remaining portion of the radio frame. The UE can temporarily leave the system during the transmission gap to make measurements for neighbor cells on other frequencies and/or in other systems without losing data from the serving cell.

Figure 3:
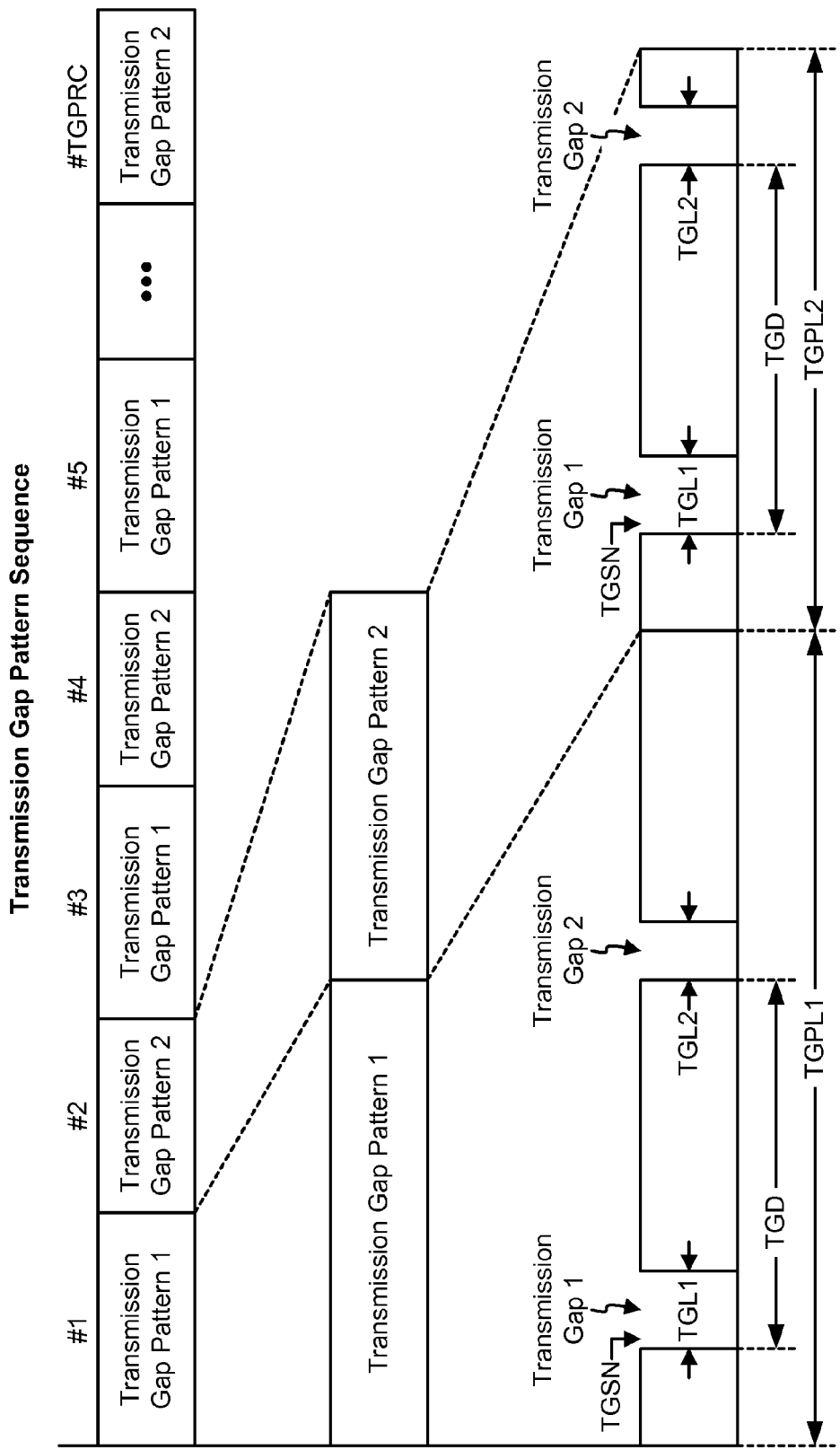
FIG. 3 shows a transmission gap pattern sequence for the compressed mode.

FIG. 3 shows a transmission gap pattern sequence for the compressed mode in UMTS. In the compressed mode, user-specific data for the UE is transmitted in accordance with the transmission gap pattern sequence, which may include alternating transmission gap patterns 1 and 2. Each transmission gap pattern includes one or two transmission gaps. Each transmission gap may occur entirely within one radio frame or may span across two radio frames. The transmission gap pattern sequence may be defined by the parameters given in Table 1.

TABLE 1

| Symbol | Parameter | Description | Value |
|---|---|---|---|
| TGPRC | Transmission gap pattern repetition count | Number of transmission gap patterns in the transmission gap pattern sequence | |
| TGCFN | Transmission gap CFN | CFN of the first radio frame for transmission gap pattern 1 | 0 to 255 |
| TGSN | Transmission gap starting slot number | Slot number of the first transmission gap slot in each transmission gap pattern | slot 1 to 14 |
| TGL1 | Transmission gap length 1 | Duration of the first transmission gap in each transmission gap pattern | 1 to 14 slots |
| TGL2 | Transmission gap length 2 | Duration of the second transmission gap in each transmission gap pattern | 1 to 14 slots |
| TGD | Transmission gap distance | Duration between the starting slots of the first and second transmission gaps | 15 to 269 slots |
| TGPL1 | Transmission gap pattern length 1 | Duration of transmission gap pattern 1 | 1 to 144 frames |
| TGPL2 | Transmission gap pattern length 2 | Duration of transmission gap pattern 2 | 1 to 144 frames |

The compressed mode is described in 3GPP TS 25.212 (section 4.4), 25.213 (sections 5.2.1 an 5.2.2), and 25.215 (section 6.1), all of which are publicly available.

Figure 4:
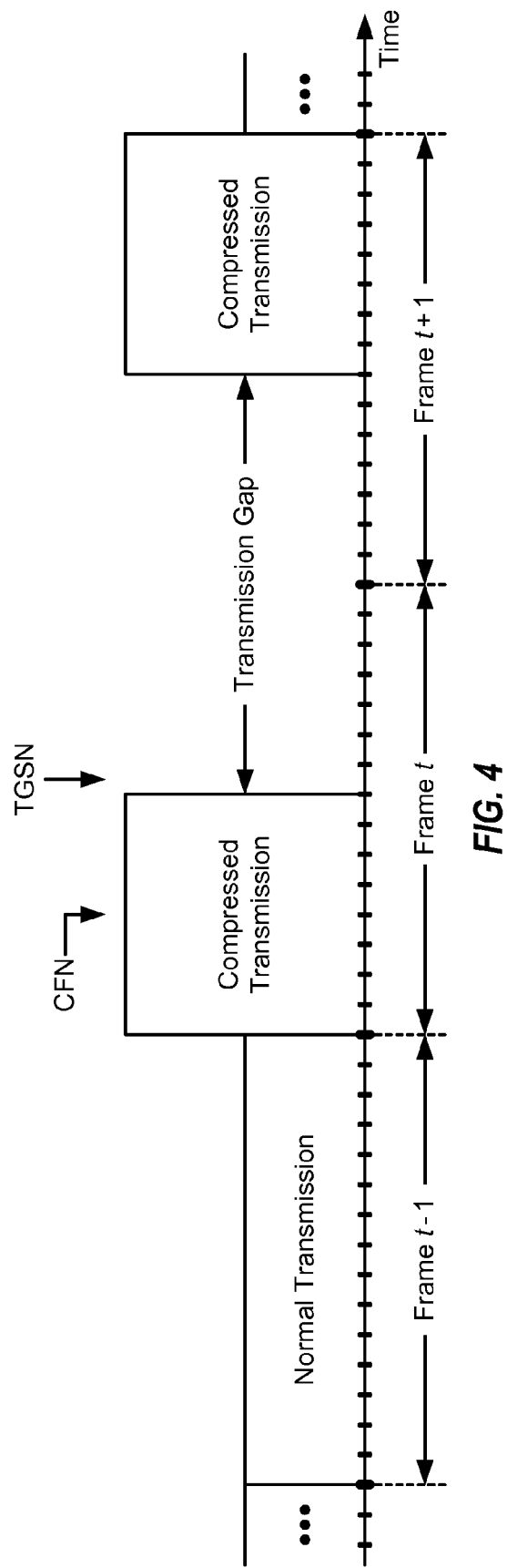
FIG. 4 shows downlink transmission in the compressed mode.

FIG. 4 shows downlink transmission in the compressed mode. Data may be transmitted at a nominal power level in each radio frame without a transmission gap. Data for a radio frame with a transmission gap may be transmitted at a higher power level to achieve similar reliability as data transmitted in a radio frame without a transmission gap. A transmission gap may occur between two compressed transmissions and may have a duration of 1 to 14 slots. A UE may be allocated a sufficient number of transmission gaps of suitable duration to allow the UE to make measurements for cells on other frequencies and/or other systems.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Table 2 lists some physical channels used for HSDPA and HSUPA in 3GPP Release 6.

TABLE 2

| | Channel | Channel Name | Description |
|---|---|---|---|
| | P-CCPCH (Downlink) | Primary Common Control Physical Channel | Carry pilot and SFN |
| HSDPA | HS-SCCH (Downlink) | Shared Control Channel for HS-DSCH | Carry signaling for packets sent on the HS-PDSCH |
| | HS-PDSCH (Downlink) | High Speed Physical Downlink Shared Channel | Carry packets sent on the downlink for different UEs |
| | HS-DPCCH (Uplink) | Dedicated Physical Control Channel for HS-DSCH | Carry ACK/NAK for packets sent on the HS-PDSCH and CQI |
| HSUPA | E-DPCCH (Uplink) | E-DCH Dedicated Physical Control Channel | Carry signaling for the E-DPDCH |
| | E-DPDCH (Uplink) | E-DCH Dedicated Physical Data Channel | Carry packets sent on the uplink by a UE |
| | E-HICH (Downlink) | E-DCH Hybrid ARQ Indicator Channel | Carry ACK/NAK for packets sent on the E-DPDCH |

Figure 5:
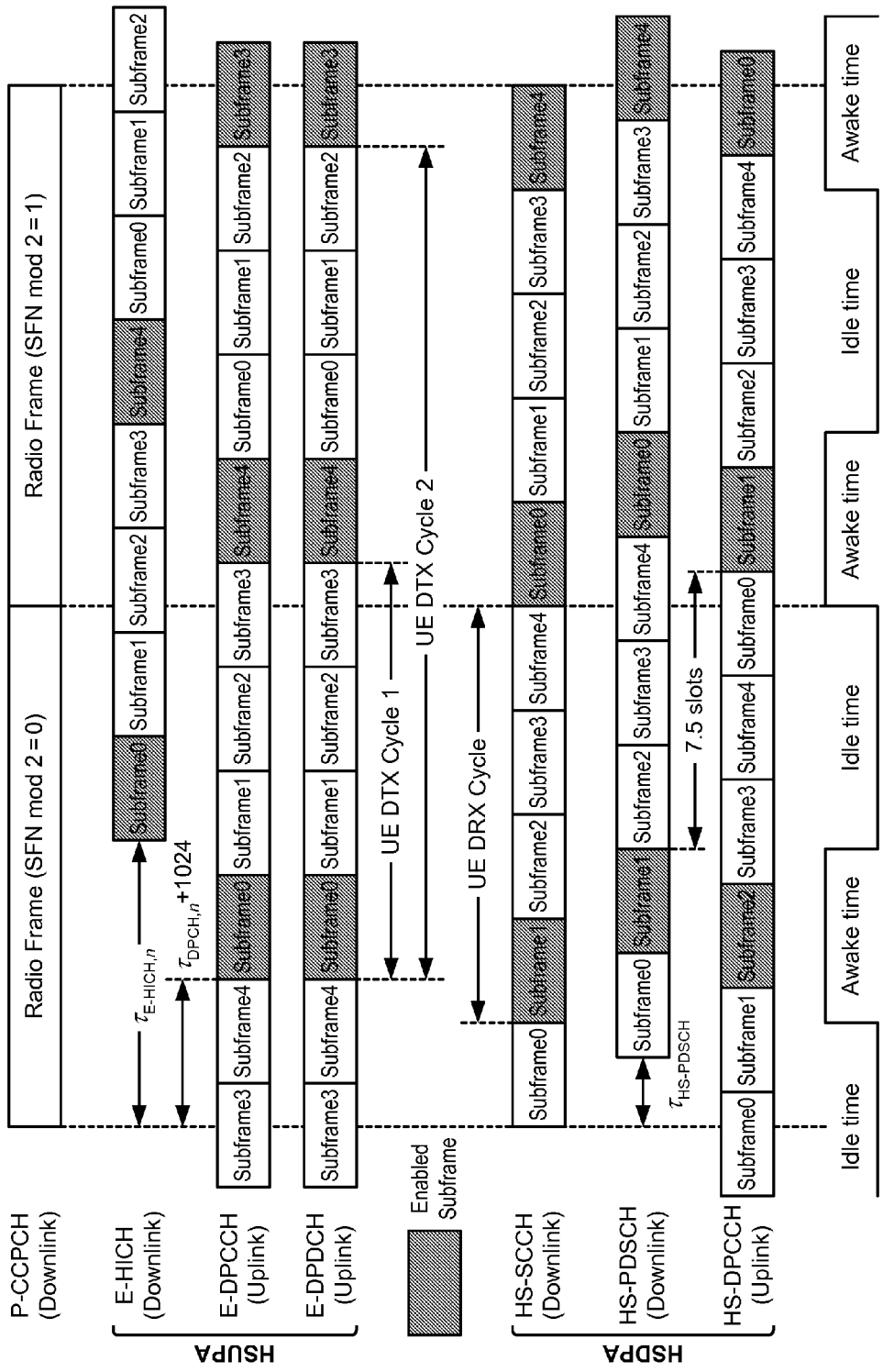
FIG. 5 shows some physical channels in UMTS.

FIG. 5 shows some of the physical channels used for HSDPA and HSUPA in UMTS. The P-CCPCH is used directly as timing reference for the downlink physical channels and is used indirectly as timing reference for the uplink physical channels. For HSDPA, the subframes of the HS-SCCH are time-aligned with the P-CCPCH. The subframes of the HS-PDSCH are delayed by $\tau_{HS\text{-}PDSCH} = 2T_{slot}$ from the subframes of the HS-SCCH. The subframes of the HS-DPCCH are delayed by 7.5 slots from the subframes of the HS-PDSCH. For HSUPA, the frame timing of the E-HICH is offset by $\tau_{E\text{-}HICH,n}$ chips from the frame timing of the P-CCPCH, where $\tau_{E\text{-}HICH,n}$ is defined in 3GPP TS 25.211. The E-DPCCH and E-DPDCH are time-aligned and their frame timing is offset by $\tau_{DPCH,n} + 1024$ chips from the frame timing of the P-CCPCH, where $\tau_{DPCH,n} = 256$ n and n can range from 0 to 149. The frame timing of the downlink and uplink physical channels is described in 3GPP TS 25.211. For simplicity, other physical channels such as grant channels are not shown in FIG. 5.

3GPP Release 7 supports CPC, which allows a UE to operate with DTX and/or DRX in order to conserve battery power. For DTX, the UE may be assigned certain enabled uplink subframes in which the UE can send uplink transmission to a Node B. The enabled uplink subframes may be defined by an uplink DPCCH burst pattern. For DRX, the UE may be assigned certain enabled downlink subframes in which the Node B can send downlink transmission to the UE. The enabled downlink subframes may also be referred to as reception frames and may be defined by an HS-SCCH reception pattern. The UE may send signaling and/or data in the enabled uplink subframes and may receive signaling and/or data in the enabled downlink subframes. The UE may power down during the idle times between the enabled subframes to conserve battery power. CPC is described in 3GPP TR 25.903, entitled "Continuous Connectivity for Packet Data Users," March 2007, which is publicly available.

For CPC, the enabled downlink and uplink subframes may be defined by the parameters given in Table 3. CPC supports a transmission time interval (TTI) of 2 ms or 10 ms. The third column of Table 3 gives possible values for the CPC parameters assuming a TTI of 2 ms.

TABLE 3

| Parameter | Description | Value |
|---|---|---|
| UE DTX cycle 1 | Duration between the enabled uplink subframes when the UE has transmitted recently | 1, 4, 5, 8, 10, 16 or 20 subframes |
| UE DTX cycle 2 | Duration between the enabled uplink subframes when the UE has not transmitted recently | 4, 5, 8, 10, 16 or 20 subframes |
| UE DRX cycle | Duration between the enabled downlink subframes | 1, 4, 5, 8, 10, 16 or 20 subframes |
| UE DPCCH burst 1 | Number of enabled uplink subframes for UE DTX cycle 1 | 1, 2 or 5 subframes |
| UE DPCCH burst 2 | Number of enabled uplink subframes for UE DTX cycle 2 | 1, 2 or 5 subframes |
| UE DTX DRX offset | UE-specific offset of the enabled subframes from a reference time. | 0 to 159 subframes |

FIG. 5 shows an example configuration of DTX and DRX for a UE in CPC. In this example, the UE is configured as follows:

UE DTX cycle 1=UE DRX cycle=4 subframes,
UE DTX cycle 2=8 subframes, and
UE DPCCH burst 1=UE DPCCH burst 2=1 subframe.

For the CPC configuration given above, the enabled downlink subframes are spaced apart by four subframes and are shown with gray shading. The enabled uplink subframes are also spaced apart by four subframes and are shown with gray shading. The alignment of the enabled downlink subframes and the enabled uplink subframes is dependent on $\tau_{DPCH,n}$. The enabled downlink and uplink subframes may be aligned in time in order to extend possible sleep time for the UE. As shown in FIG. 5, the UE may be awake during the enabled downlink and uplink subframes and may go to sleep during the idle times between the enabled subframes. FIG. 5 assumes that the UE does not transmit data on the uplink and hence does not need to monitor the E-HICH for ACK/NAK. The idle times may also be referred to as sleep times, DTX/DRX times, etc.

A UE may operate in the compressed mode and may be assigned a transmission gap pattern sequence. The UE may not receive or send data during the transmission gaps. The UE may also operate in the CPC mode and may be assigned certain enabled downlink and uplink subframes for DTX and DRX operation. The UE may not receive or send data during the non-enabled subframes. When the UE operates in both modes, the transmission gaps in the compressed mode may impact the operation of the CPC mode. It may thus be desirable to support inter-working between the compressed mode and the CPC mode.

In an aspect, the transmission gaps in the compressed mode may be defined to be time aligned (or to coincide) with the idle times in the CPC mode. The parameters for the two modes may be selected to achieve the following:

1. The periodicity of the transmission gaps is an integer multiple of the periodicities of the enabled downlink and uplink subframes, and
2. The transmission gaps start during the idle times for CPC.

The transmission gap pattern sequence may be defined to include only transmission gap pattern 1 in FIG. 3. For condition 1 above, TGPL1 may be defined to be an integer multiple of UE DTX cycle 1. For condition 2, TGCFN and TGSN may be defined to take into account the UE DTX DRX offset. Furthermore, TGL1 may be defined as a function of the idle times, which may be dependent on $\tau_{DPCH,n}$. If a second transmission gap is included in transmission gap pattern 1, then TGD and TGL2 may be defined as a function of $\tau_{DPCH,n}$, UE DTX cycle 1, and UE DTX DRX offset such that the second transmission gap coincides with the idle times for CPC.

A transmission gap in the compressed mode may have a duration of 1 to 14 slots. An idle time in the CPC mode may be shorter than the transmission gap. In one design, the transmission gap may blank out enabled subframes that fall within the transmission gap. In this design, data is not transmitted in the enabled subframes that fall within the transmission gap.

For a CPC configuration with UE DTX cycle 1 and UE DRX cycle both equal to four subframes, as shown in FIG. 5, it can be shown that the idle times can vary between 1.5 to 4.5 slots, depending on $\tau_{DPCH,n}$. These idle times are approximate and assume transmission and reception in all enabled subframes. To obtain a longer idle time, the UE may skip one awake period, in which case the idle time may be extended to between 13.5 to 16.5 slots. The extended idle time approximately matches the longest possible transmission gap duration. For a CPC configuration with UE DTX cycle 1 and UE DRX cycle both equal to eight subframes, it can be shown that the idle times can vary between 7 to 11 slots in one cycle, depending on $\tau_{DPCH,n}$. However, the idle time of 7 slots is divided into two lengths of 1.5 and 5.5 slots, and the idle time of 11 slots is divided into two lengths of 4.5 and 6.5 slots. If the UE skips one awake period, then the idle time may be extended to between 15 to 16.5 slots, which is longer than the longest possible transmission gap duration. In general, an extended idle time matching or exceeding a transmission gap may be obtained by skipping a sufficient number of awake periods.

The UE and Node B may skip transmissions in enabled subframes that fall within transmission gaps. On the downlink, the UE may not be listening during the transmission gaps, and the Node B may avoid sending data to the UE during the transmission gaps. On the uplink, the UE may avoid sending transmission during transmission gaps. If the UE is not configured for DRX in CPC, then the UE may monitor all downlink subframes except for the ones that overlap the transmission gaps.

Figure 6:
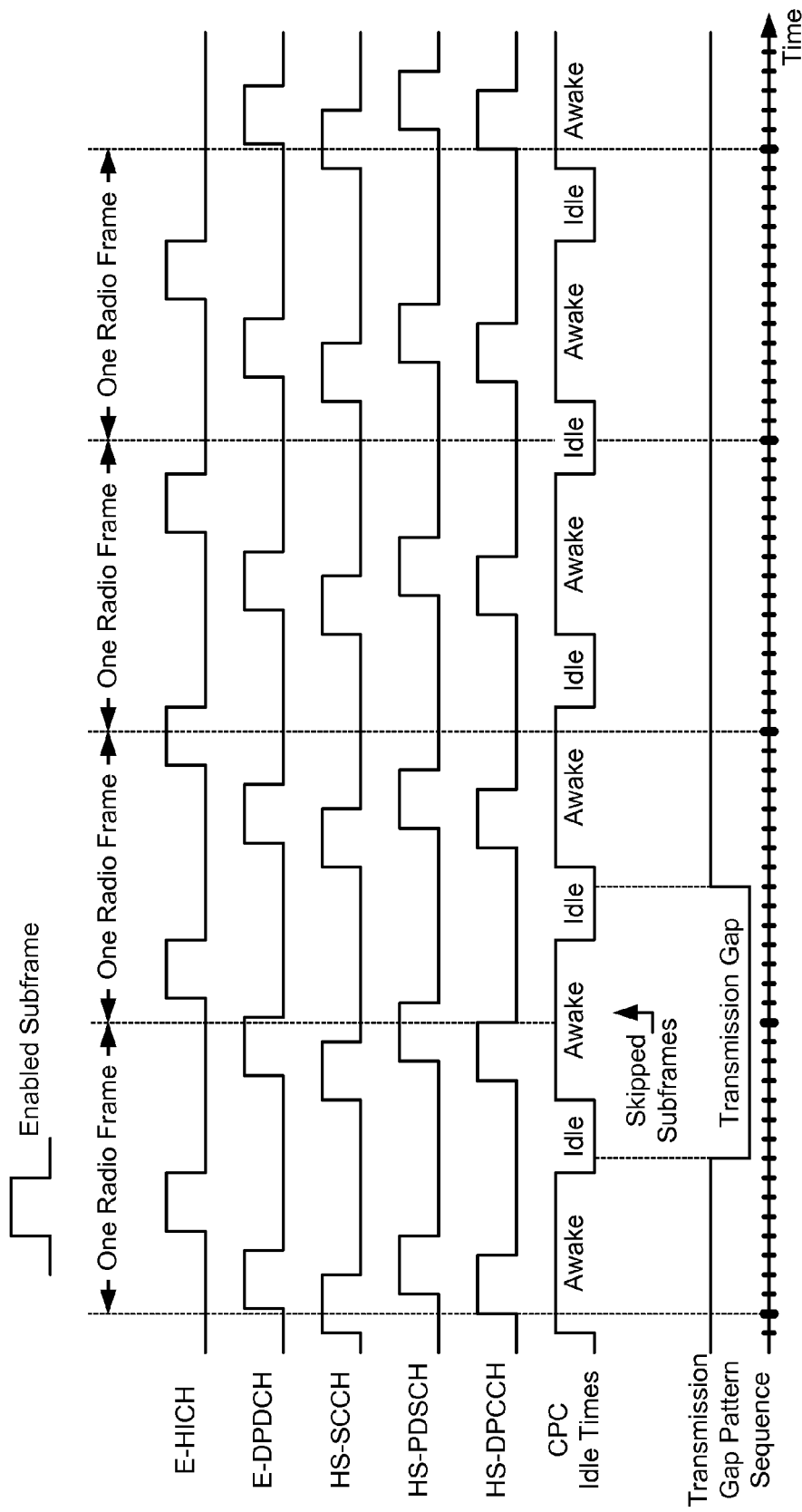
FIG. 6 shows alignment of a transmission gap to idle times in the CPC mode.

FIG. 6 shows an example of alignment of a transmission gap in the compressed mode with the idle times in the CPC mode. The enabled subframes for each physical channel in FIG. 5 are shown at the top of FIG. 6. The idle times for the CPC mode are shown near the bottom of FIG. 6. One transmission gap in the compressed mode is shown at the bottom of FIG. 6. This transmission gap has the maximum duration of 14 slots and is aligned to two idle times for the CPC mode. The enabled subframes in one awake time that falls within the transmission gap may be skipped. The UE may skip transmission and reception during the skipped subframes. A skipped subframe is an enabled subframe that is skipped so that data or signaling is not sent during the subframe.

In another aspect, a UE may operate in the CPC mode, and extended idle times for measurements on other frequencies and/or in other systems may be obtained by skipping some enabled subframes. The UE does not transmit during skipped uplink subframes and does not receive during skipped downlink subframes, which are exceptions to the general CPC rules.

Figure 7:
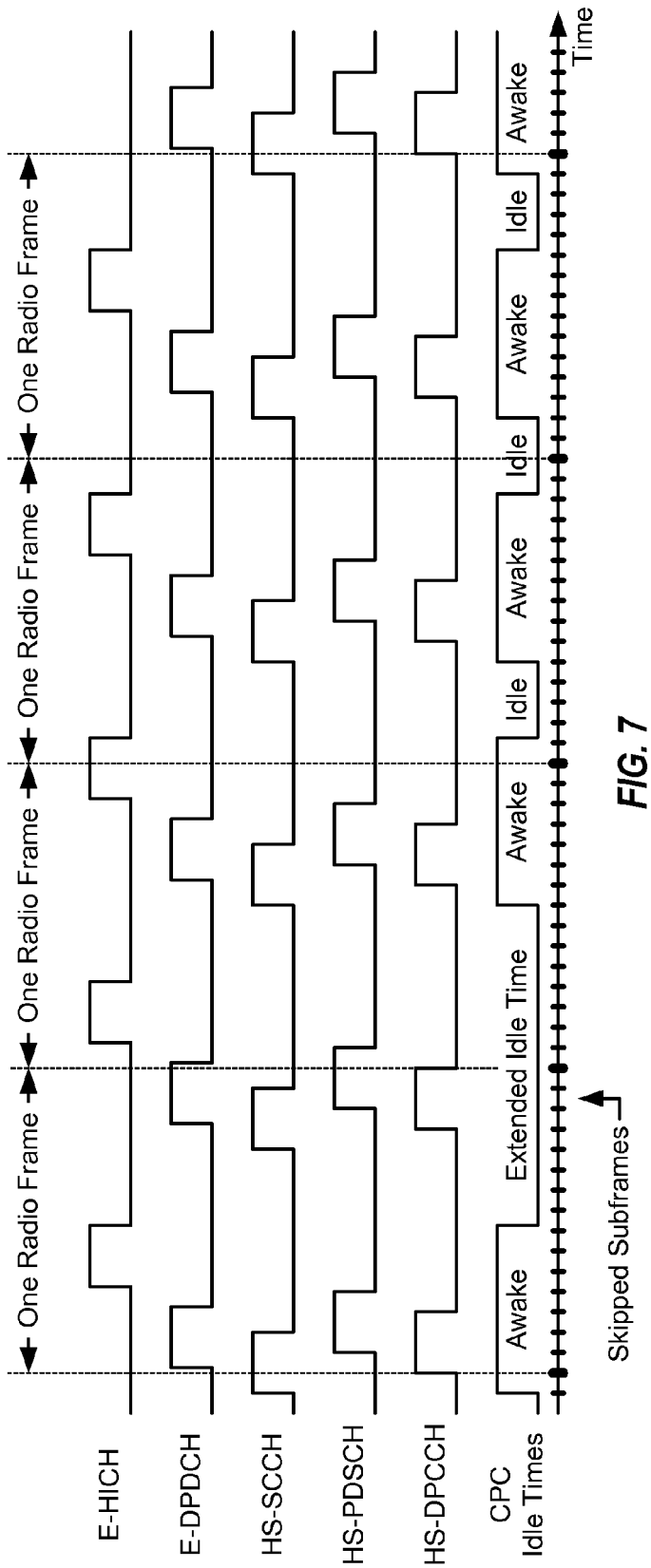
FIG. 7 shows skipping enabled subframes to obtain an extended idle time.

FIG. 7 shows an example of skipping enabled subframes to obtain an extended idle time in the CPC mode. The enabled subframes for each physical channel in FIG. 5 are shown at the top of FIG. 7. The idle times for the CPC mode are shown at the bottom of FIG. 7. A set of enabled subframes in one awake time may be skipped to obtain an extended idle time, which may cover two normal idle times and one awake time. The UE may make cell measurements during the extended idle time.

The skipped subframes may be defined by a pattern, which may be determined based on various factors such as the UE capabilities. For example, if the UE is configured such that the idle times in CPC are sufficiently long, then no enabled subframes may be skipped. Conversely, if the UE is configured such that the idle times are not long enough, then certain enabled subframes may be skipped to obtain sufficiently long extended idle times. A skipped subframe pattern may be conveyed to the UE using the signaling mechanism used to configure the compressed mode. The skipped subframe pattern may also be conveyed to the UE in other manners. Since the extended idle times have sufficiently long duration, the UE does not need to operate in the compressed mode.

Conventionally, the compressed mode is configured using upper layer signaling and is enabled all the time until it is disabled with additional upper layer signaling. The use of upper layer signaling may result in longer delay in configuring and enabling the compressed mode and may also consume more signaling resources.

In yet another aspect, a UE may be configured with a transmission gap pattern sequence for the compressed mode, and orders to enable and disable the compressed mode may be sent on the HS-SCCH. The transmission gap pattern sequence may be defined as described in 3GPP Release 6 or as described above to align the transmission gaps with the idle times in CPC. DTX/DRX in the CPC mode may be enabled and disabled with orders sent on the HS-SCCH. The HS-SCCH orders are lower layer signaling that may be sent more quickly and efficiently than upper layer signaling. The HS-SCCH orders may be used to quickly enable and disable the compressed mode for the UE. For example, the Node B may quickly disable the compressed mode for the UE whenever the Node B has a large amount of data to send to the UE and may thereafter quickly re-enable the compressed mode after sending the data.

Figure 8:
FIG. 8 shows an order to quickly enable or disable the compressed mode.

FIG. 8 shows a design of an HS-SCCH order format 800 that may be used to quickly enable and disable the compressed mode for the UE. A signaling message sent on the HS-SCCH may include two parts. Part 1 may include a 7-bit field for a channelization code set and a 1-bit field for a modulation scheme (Mod). Part 2 may include a 6-bit format ID field, a 3-bit order type field, a 4-bit order field, and a 16-bit UE identity/CRC field. The format ID field may be set to a predetermined value (e.g., '111110') to indicate that the message contains an order instead of signaling for the HS-PD-SCH. The order type field may be set to a predetermined value (e.g., '001') to indicate that the order is for the compressed mode (CM) instead of DRX or something else. The order field may have a designated bit that may be set to one value (e.g., '1') to enable the compressed mode or to another value (e.g., '0') to disable the compressed mode. The HS-SCCH order for the compressed mode may also be sent in other manners using other message formats.

FIG. 9 shows a design of a process 900 for operation by a UE. An assignment of enabled subframes for a first mode (e.g., the CPC mode) may be obtained (block 912). An assignment of transmission gaps for a second mode (e.g., the compressed mode) may be obtained (block 914). The transmission gaps may be aligned with idle times between the enabled subframes. A first set of at least one parameter for the transmission gaps may be determined based on a second set of at least one parameter for the enabled subframes to align the transmission gaps with the idle times. Each transmission gap may start in an idle time between consecutive enabled subframes. The enabled subframes may be defined by at least one first pattern, e.g., an uplink DPCCH burst pattern and/or an HS-SCCH reception pattern. The transmission gaps may be defined by at least one second pattern, e.g., at least one transmission gap pattern. Each second pattern may be multiple times the duration of each first pattern.

Data may be exchanged (e.g., sent and/or received) during the enabled subframes that do not overlap the transmission gaps (block 916). Data exchanges may be skipped during the enabled subframes that overlap the transmission gaps (block 918). Cell measurements (e.g., for other frequencies and/or other systems) may be made during the transmission gaps (block 920).

FIG. 10 shows a design of a process 1000 for operation by a UE. Enabled subframes for the UE may be determined, e.g., based on at least one first pattern that may include an uplink DPCCH burst pattern and/or an HS-SCCH reception pattern (block 1012). Skipped subframes for the UE may be determined, e.g., based on a second pattern (block 1014). The skipped subframes may be a subset of the enabled subframes. Data may be exchanged during enabled subframes not corresponding to the skipped subframes (block 1016). Data exchanges may be skipped during the skipped subframes (block 1018). Cell measurements may be made during extended idle times, which are between the enabled subframes and cover the skipped subframes, e.g., as shown in FIG. 7 (block 1020).

Figures 11, 12:
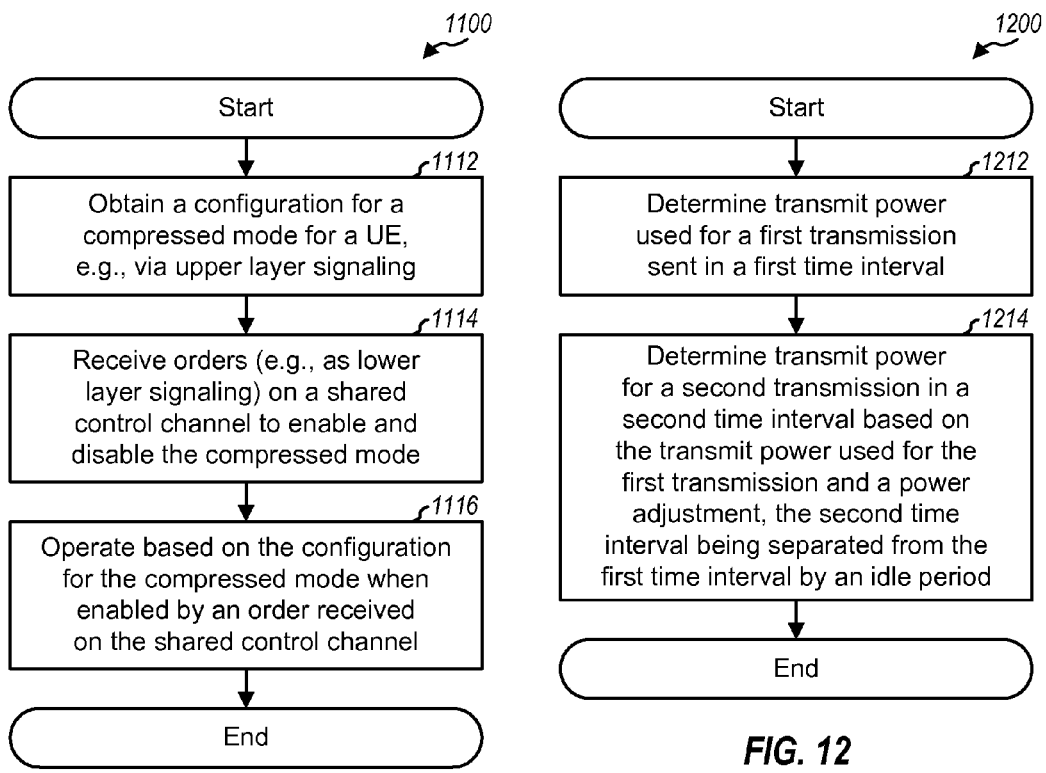
FIG. 11 shows a process for UE operation with quick enabling and disabling of the compressed mode via orders.
FIG. 12 shows a process for transmission after an idle period by the UE.

FIG. 11 shows a design of a process 1100 for operation by a UE. A configuration for a compressed mode for the UE may be obtained, e.g., via upper layer signaling or some other means (block 1112). Orders may be received on a shared control channel to enable and disable the compressed mode (block 1114). The orders may be sent as lower layer (e.g., L1/L2) signaling. The UE may operate based on the configuration for the compressed mode when enabled by an order received on the shared control channel (block 1116). The configuration for the compressed mode may indicate transmission gaps. Data exchanges may be skipped during the transmission gaps when the compressed mode is enabled. The UE may receive an order to disable the compressed mode, then receive a data transmission burst, and then receive an order to enable the compressed mode.

A UE may resume transmission after an idle period in either the compressed mode or the CPC mode. The UE may store the transmit power used at the end of a prior transmission and may use this transmit power for a current transmission. However, the channel conditions may have changed during the idle period. In this case, the transmit power used for the prior transmission may not be sufficient for the current transmission, which may be more unreliable as a result.

In one design, the UE uses open loop estimates to determine the transmit power for the current transmission. An open loop estimate may be an estimate of the path loss from a Node B to a UE and may be obtained based on pilot transmitted by the Node B. If the pilot is transmitted at known or constant transmit power, then the path loss may be determined based on the received pilot power at the UE. The UE may make a first open loop estimate at the end of the prior transmission and may make a second open loop estimate at the start of the current transmission. If the transmit power for the pilot is constant, then each open loop estimate may be equal to the received pilot power. The UE may determine the transmit power for the current transmission as follows:

$$P_2=P_1+A_{OL}, \text{ and} \qquad \text{Eq (1)}$$

$$A_{OL}=OL_1-OL_2, \qquad \text{Eq (2)}$$

where $P_1$ is the transmit power for the prior transmission,
$P_2$ is the transmit power for the current transmission,
$OL_1$ is the first open loop estimate for the prior transmission,
$OL_2$ is the second open loop estimate for the current transmission, and
$A_{OL}$ is a power adjustment based on the open loop estimates.

If the open loop estimate (e.g., the received pilot power) for the current transmission is less than the open loop estimate for the prior transmission, which may indicate deteriorated channel conditions, then $A_{OL}$ may be a positive value, and higher transmit power may be used for the current transmission. This may improve the reliability of the current transmission. Conversely, if $OL_2$ is greater than $OL_1$, then $A_{OL}$ may be set either (i) to a negative value to possibly reduce interference or (ii) to zero to ensure that the transmit power for the current transmission is equal to or greater than the transmit power for the prior transmission.

In another design, the UE starts with a positive offset power adjustment for the current transmission. In this design, the UE may determine the transmit power for the current transmission as follows:

$$P_2=P_1+A_{OS}, \qquad \text{Eq (3)}$$

where $A_{OS}$ is the positive offset power adjustment. $A_{OS}$ may be a fixed value, e.g., X decibels (dB), where X may be a suitably selected value. Alternatively, $A_{OS}$ may be a configurable value, e.g., determined based on the amount and/or rate of change in transmit power during the prior transmission.

In yet another design, the UE ramps up the transmit power during a preamble of the current transmission. A preamble is pilot sent prior to data transmission in an enabled uplink subframe. The preamble length may be configurable and may be 2 to 15 slots for CPC. In this design, the UE may increase the transmit power in each slot during the preamble, as follows:

$$P_2 = P_1 + A_m, \text{ for } m=1,2,\ldots,\qquad \text{Eq (4)}$$

where $A_m$ is a power adjustment for the m-th slot of the preamble, with $A_1 < A_2 < \ldots$, $A_m$ may be a fixed value or a configurable value.

For all designs described above, a power control mechanism may be used to adjust the transmit power of the UE to achieve the desired performance. For this power control mechanism, the Node B may receive the current transmission from the UE, determine the received signal quality of the transmission, and send power control (PC) commands to adjust the transmit power of the UE to achieve the desired received signal quality. The power adjustment by the UE at the start of the current transmission may ensure that sufficient transmit power is used for the transmission. The power control mechanism may ensure that the transmit power is adjusted to the proper level to achieve good performance for the UE while reducing interference to other UEs.

FIG. 12 shows a design of a process 1200 for transmission by a UE. Transmit power used for a first transmission sent in a first time interval (e.g., a first enabled uplink subframe) may be determined (block 1212). Transmit power for a second transmission in a second time interval (e.g., a second enabled uplink subframe) may be determined based on the transmit power used for the first transmission and a power adjustment (block 1214). The second time interval may be separated from the first time interval by an idle period, which may correspond to a transmission gap in the compressed mode or an idle time between two enabled subframes in the CPC mode.

In one design, the power adjustment may be determined based on a first open loop estimate obtained for the first transmission and a second open loop estimate obtained for the second transmission. The first open loop estimate may be based on received pilot power at the end of the first time interval, and the second open loop estimate may be based on received pilot power at the start of the second time interval. In another design, the power adjustment is a predetermined positive value. In yet another design, the power adjustment is an increasing value during an initial part (e.g., a preamble) of the second transmission.

Figure 13:
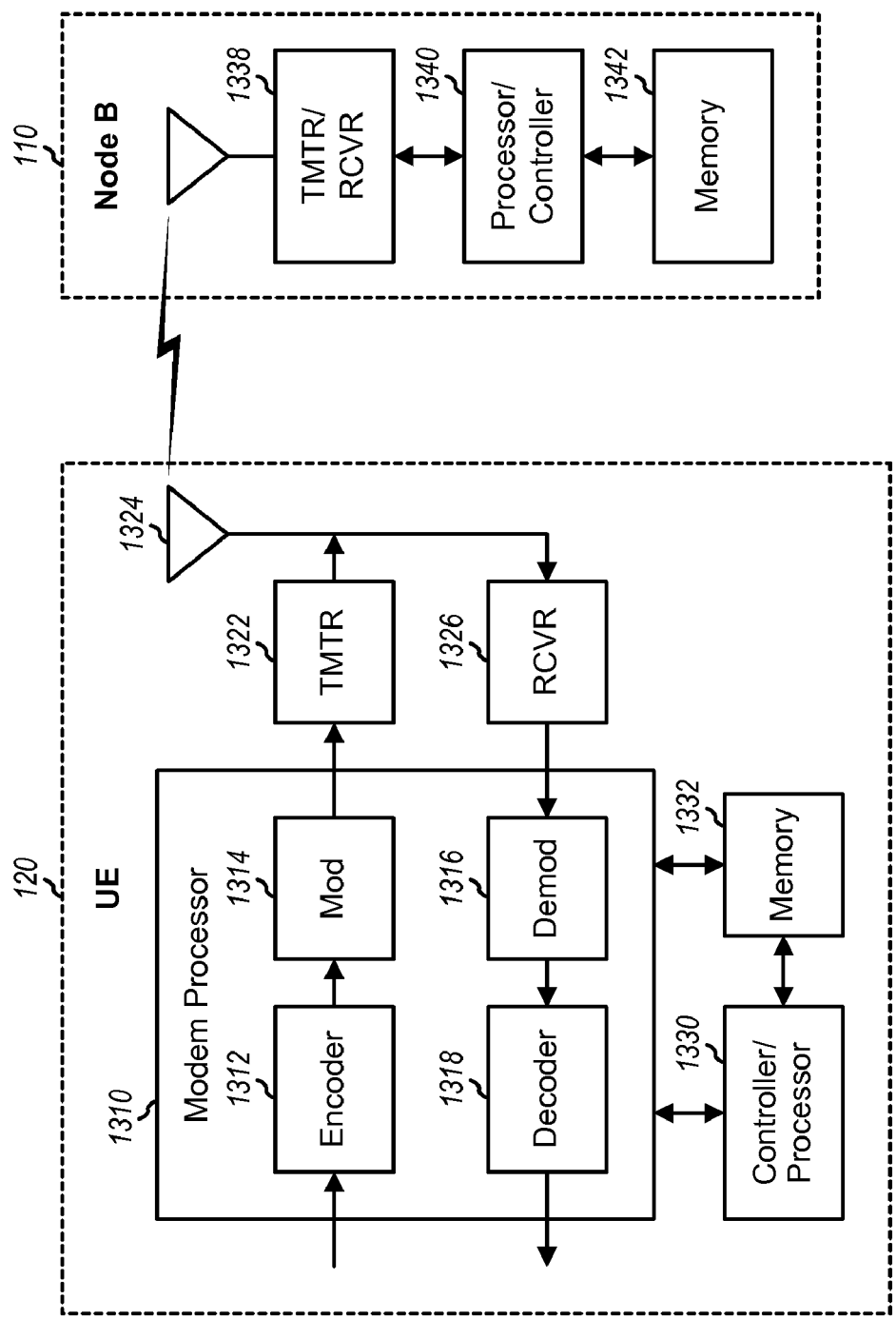
FIG. 13 shows a block diagram of the UE and a Node B.

FIG. 13 shows a block diagram of a design of UE 120, which may be one of the UEs in FIG. 1. On the uplink, an encoder 1312 may receive data and signaling to be sent by UE 120 on the uplink. Encoder 1312 may process (e.g., format, encode, and interleave) the data and signaling. A modulator (Mod) 1314 may further process (e.g., modulate, channelize, and scramble) the encoded data and signaling and provide output chips. A transmitter (TMTR) 1322 may condition (e.g., convert to analog, filter, amplify, and frequency upconvert) the output chips and generate an uplink signal, which may be transmitted via an antenna 1324 to Node B 110.

On the downlink, antenna 1324 may receive downlink signals transmitted by Node B 110 and other Node Bs. A receiver (RCVR) 1326 may condition (e.g., filter, amplify, frequency downconvert, and digitize) the received signal from antenna 1324 and provide samples. A demodulator (Demod) 1316 may process (e.g., descramble, channelize, and demodulate) the samples and provide symbol estimates. A decoder 1318 may further process (e.g., deinterleave and decode) the symbol estimates and provide decoded data and signaling. The downlink signaling may comprise configuration information for the compressed mode (e.g., a transmission gap pattern sequence), configuration information for the CPC mode (e.g., enabled downlink and uplink subframes), HS-SCCH orders to configure, enable and/or disable the CPC mode and/or the compressed mode, etc. Encoder 1312, modulator 1314, demodulator 1316, and decoder 1318 may be implemented by a modem processor 1310. These units may perform processing in accordance with the radio technology (e.g., W-CDMA, GSM, etc.) used by the system.

A controller/processor 1330 may direct the operation of various units at UE 120. Controller/processor 1330 may implement process 900 in FIG. 9, process 1000 in FIG. 10, process 1100 in FIG. 11 and/or other processes to support operation in the CPC and/or compressed mode. Controller/processor 1330 may also implement process 1200 in FIG. 12 and/or other processes for power control on the uplink. Memory 1332 may store program codes and data for UE 120.

FIG. 13 also shows a block diagram of Node B 110, which may be one of the Node Bs in FIG. 1. Within Node B 110, a transmitter/receiver 1338 may support radio communication with UE 120 and other UEs. A processor/controller 1340 may perform various functions for communication with the UEs. Processor/controller 1340 may perform the Node B side processing for each of the processes shown in FIGS. 9 through 12 to support operation of UE 120 in the CPC and/or compressed mode. Memory 1342 may store program codes and data for Node B 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising: at least one processor configured to:
   obtain an assignment of enabled subframes corresponding to selected ones of a plurality of subframes within a first radio frame for a first mode for a user equipment (UE), wherein at least one idle time is between at least two of the enabled subframes, wherein the first mode is a continuous packet connectivity (CPC) mode, wherein the enabled subframes comprise subframes for at least one of transmission or reception; and
   obtain an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode.

2. The apparatus of claim 1, wherein the at least one processor exchanges data during enabled subframes not overlapping the at least one transmission gap, and skips data exchanges during enabled subframes overlapping the at least one transmission gap.

3. The apparatus of claim 1, wherein the at least one processor makes cell measurements during the at least one transmission gap.

4. The apparatus of claim 1, wherein the at least one transmission gap starts in an idle time between consecutive enabled subframes.

5. The apparatus of claim 1, wherein the at least one processor obtains an assignment of at least one first pattern for the enabled subframes, and obtains an assignment of at least one second pattern for the at least one transmission gap, each second pattern being multiple times the duration of each first pattern.

6. The apparatus of claim 1, wherein the at least one idle time is defined in accordance with a configurable timing offset of a Dedicated Physical Channel (DPCH) of the second mode.

7. The apparatus of claim 6, wherein the at least one idle time is extended by including at least one of the enabled subframes that is in an awake time and that falls within the at least one transmission gap.

8. The apparatus of claim 1, wherein the at least one processor determines transmit power for a current transmission of at least one of the enabled frames based upon:

$$P_2 = P_1 + A_{OL}, \text{ and } A_{OL} = OL_1 - OL_2,$$

wherein $P_1$ is transmit power for a prior transmission, $P_2$ is the transmit power for the current transmission, $OL_1$ is a first open loop estimate for the prior transmission, $OL_2$ is a second open loop estimate for the current transmission, and $A_{OL}$ is a power adjustment based on the open loop estimates.

9. A method for wireless communication, comprising:
   obtaining an assignment of enabled subframes corresponding to selected ones of a plurality of subframes within a first radio frame for a first mode for a user equipment (UE), wherein at least one idle time is between at least two of the enabled subframes, wherein the first mode is a continuous packet connectivity (CPC) mode, wherein the enabled subframes comprise subframes for at least one of transmission or reception; and
   obtaining an assignment of at least one transmission gap within a second radio frame for a second mode for the UE, wherein the second mode is a compressed mode in Universal Mobile Telecommunication System (UMTS), the at least one transmission gap in the compressed mode being aligned with the at least one idle time in the first mode.

10. The method of claim 9, further comprising:
   exchanging data during enabled subframes not overlapping the at least one transmission gap; and
   skipping data exchanges during enabled subframes overlapping the at least one transmission gap.

11. The method of claim 9, further comprising:
   making cell measurements during the at least one transmission gap.

12. The method of claim 9, wherein the at least one idle time is defined in accordance with a configurable timing offset of a Dedicated Physical Channel (DPCH) of the second mode.

13. The method of claim 12, wherein the at least one idle time is extended by including at least one of the enabled subframes that is in an awake time and that falls within the at least one transmission gap.

14. The method of claim 9, further comprising determining transmit power for a current transmission of at least one of the enabled frames based upon:

$$P_2 = P_1 + A_{OL}, \text{ and } A_{OL} = OL_1 - OL_2,$$

wherein $P_1$ is transmit power for a prior transmission, $P_2$ is the transmit power for the current transmission, $OL_1$ is a first open loop estimate for the prior transmission, $OL_2$ is a second open loop estimate for the current transmission, and $A_{OL}$ is a power adjustment based on the open loop estimates.

15. An apparatus for wireless communication, comprising:
means for obtaining an assignment of enabled subframes corresponding to selected ones of a plurality of subframes within a first radio frame for a first mode for a user equipment (UE), wherein at least one idle time is between at least two of the enabled subframes, wherein the first mode is a continuous packet connectivity (CPC) mode, wherein the enabled subframes comprise subframes for at least one of transmission or reception; and
means for obtaining an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode.

16. The apparatus of claim 15, further comprising:
means for exchanging data during enabled subframes not overlapping the at least one transmission gap; and
means for skipping data exchanges during enabled subframes overlapping the at least one transmission gap.

17. The apparatus of claim 15, further comprising:
means for making cell measurements during the at least one transmission gap.

18. The apparatus of claim 15, wherein the at least one idle time is defined in accordance with a configurable timing offset of a Dedicated Physical Channel (DPCH) of the second mode.

19. The apparatus of claim 18, wherein the at least one idle time is extended by including at least one of the enabled subframes that is in an awake time and falls within the at least one transmission gap.

20. The apparatus of claim 15, further comprising means for determining transmit power for a current transmission of at least one of the enabled frames based upon:

$$P_2 = P_1 + A_{OL}, \text{ and } A_{OL} = OL_1 - OL_2,$$

wherein $P_1$ is transmit power for a prior transmission, $P_2$ is the transmit power for the current transmission, $OL_1$ is a first open loop estimate for the prior transmission, $OL_2$ is a second open loop estimate for the current transmission, and $A_{OL}$ is a power adjustment based on the open loop estimates.

21. A computer program product, comprising:
a non-transitory computer-readable medium comprising:
code for causing a computer to obtain an assignment of enabled subframes corresponding to selected ones of a plurality of subframes within a first radio frame for a first mode for a user equipment (UE), wherein at least one idle time is between at least two of the enabled subframes, wherein the first mode is a continuous packet connectivity (CPC) mode, wherein the enabled subframes comprise subframes for at least one of transmission or reception; and
code for causing the computer to obtain an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode.

22. The computer program product of claim 21, wherein the at least one idle time is defined in accordance with a configurable timing offset of a Dedicated Physical Channel (DPCH) of the second mode.

23. The computer program product of claim 22, wherein the at least one idle time is extended by including at least one of the enabled subframes that is in an awake time and that falls within the at least one transmission gap.

24. The computer program product of claim 21, further comprising code for determining transmit power for a current transmission of at least one of the enabled frames based upon:

$$P_2 = P_1 + A_{OL}, \text{ and } A_{OL} = OL_1 - OL_2,$$

wherein $P_1$ is transmit power for a prior transmission, $P_2$ is the transmit power for the current transmission, $OL_1$ is a first open loop estimate for the prior transmission, $OL_2$ is a second open loop estimate for the current transmission, and $A_{OL}$ is a power adjustment based on the open loop estimates.

25. An apparatus for wireless communication, comprising:
at least one processor configured to:
determine an assignment of enabled subframes for a first mode corresponding to selected ones of a plurality of subframes within a first radio frame for a user equipment (UE), wherein at least one idle time is between at least two of the enabled subframes, wherein the first mode is a continuous packet connectivity (CPC) mode, wherein the enabled subframes comprise subframes for at least one of transmission or reception;
determine an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode; and
send the assignment of the enabled subframes and the assignment of the at least one transmission gap to the UE.

26. The apparatus of claim 25, wherein the at least one processor determines a first set of at least one parameter for the at least one transmission gap based on a second set of at least one parameter for the enabled subframes.

27. The apparatus of claim 26, wherein the first set of at least one parameter at least defines a first periodicity of the at least one transmission gap, and the second set of at least one parameter at least defines a second periodicity of the enabled subframes.

28. The apparatus of claim 27, wherein the first periodicity is an integer multiple of the second periodicity.

29. The apparatus of claim 25, wherein the at least one idle time is defined in accordance with a configurable timing offset of a Dedicated Physical Channel (DPCH) of the second mode.

30. The apparatus of claim 29, wherein the at least one idle time is extended by including at least one of the enabled subframes that is in an awake time and that falls within the at least one transmission gap.

31. The apparatus of claim 25, wherein the at least one processor determines transmit power for a current transmission of at least one of the enabled frames based upon:

$$P_2 = P_1 + A_{OL}, \text{ and } A_{OL} = OL_1 - OL_2,$$

wherein $P_1$ is transmit power for a prior transmission, $P_2$ is the transmit power for the current transmission, $OL_1$ is a first open loop estimate for the prior transmission, $OL_2$ is a second open loop estimate for the current transmission, and $A_{OL}$ is a power adjustment based on the open loop estimates.

32. A method for wireless communication, comprising:
determining an assignment of enabled subframes for a first mode corresponding to selected ones of a plurality of subframes within a first radio frame for a user equipment (UE), wherein at least one idle time is between at least two of the enabled subframes, wherein the first mode is a continuous packet connectivity (CPC) mode, wherein the enabled subframes comprise subframes for at least one of transmission or reception;
determining an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode; and
sending the assignment of the enabled subframes and the assignment of the at least one transmission gap to the UE.

33. The apparatus of claim 32, further comprising determining a first set of at least one parameter for the at least one transmission gap based on a second set of at least one parameter for the enabled subframes.

34. The method of claim 33, wherein the first set of at least one parameter at least defines a first periodicity of the at least one transmission gap, and the second set of at least one parameter at least defines a second periodicity of the enabled subframes.

35. The method of claim 34, wherein the first periodicity is an integer multiple of the second periodicity.

36. The method of claim 32, wherein the at least one idle time is defined in accordance with a configurable timing offset of a Dedicated Physical Channel (DPCH) of the second mode.

37. The method of claim 32, wherein the at least one idle time is extended by including at least one of the enabled subframes that is in an awake time and that falls within the at least one transmission gap.

38. The method of claim 32, further comprising determining transmit power for a current transmission of at least one of the enabled frames based upon:

$$P_2 = P_1 + A_{OL}, \text{ and } A_{OL} = OL_1 - OL_2,$$

wherein $P_1$ is transmit power for a prior transmission, $P_2$ is the transmit power for the current transmission, $OL_1$ is a first open loop estimate for the prior transmission, $OL_2$ is a second open loop estimate for the current transmission, and $A_{OL}$ is a power adjustment based on the open loop estimates.

39. An apparatus for wireless communication, comprising:
means for determining an assignment of enabled subframes for a first mode corresponding to selected ones of a plurality of subframes within a first radio frame for a user equipment (UE), wherein at least one idle time is between at least two of the enabled subframes, wherein the first mode is a continuous packet connectivity (CPC) mode, wherein the enabled subframes comprise subframes for at least one of transmission or reception;
means for determining an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode; and
means for sending the assignment of the enabled subframes and the assignment of the at least one transmission gap to the UE.

40. A computer program product, comprising:
a non-transitory computer-readable medium comprising:
code for causing a computer to determine an assignment of enabled subframes for a first mode corresponding to selected ones of a plurality of subframes within a first radio frame for a user equipment (UE), wherein at least one idle time is between at least two of the enabled subframes, wherein the first mode is a continuous packet connectivity (CPC) mode, wherein the enabled subframes comprise subframes for at least one of transmission or reception;
code for causing the computer to determine an assignment of at least one transmission gap within a second radio frame for a second mode for the UE, wherein the second mode is a compressed mode in Universal Mobile Telecommunication System (UMTS), the at least one transmission gap in the second mode being aligned with the at least one idle time in the first mode; and
code for causing the computer to send the assignment of the enabled subframes and the assignment of the at least one transmission gap to the UE.

* * * * *